US007131582B2

(12) United States Patent
Welton

(10) Patent No.: US 7,131,582 B2
(45) Date of Patent: Nov. 7, 2006

(54) METHODS AND SYSTEMS FOR FULFILLING A PREPAID TELECOMMUNICATION SERVICES ACCOUNT

(75) Inventor: Mark Welton, Great Falls, VA (US)

(73) Assignee: Qwest Communications International Inc., Denver, CO (US)

(*) Notice: Subject to any disclaimer, the term of this patent is extended or adjusted under 35 U.S.C. 154(b) by 334 days.

(21) Appl. No.: 10/488,080

(22) PCT Filed: Aug. 26, 2002

(86) PCT No.: PCT/US02/27481

§ 371 (c)(1),
(2), (4) Date: Feb. 24, 2004

(87) PCT Pub. No.: WO03/019409

PCT Pub. Date: Mar. 6, 2003

(65) Prior Publication Data

US 2004/0218741 A1 Nov. 4, 2004

Related U.S. Application Data

(63) Continuation-in-part of application No. 09/939,519, filed on Aug. 24, 2001, now Pat. No. 6,581,827.

(51) Int. Cl.
*G06K 5/00* (2006.01)

(52) U.S. Cl. .................................... 235/380; 383/375
(58) Field of Classification Search ............... 235/380, 235/379, 381, 383, 375; 705/16, 17
See application file for complete search history.

(56) References Cited

U.S. PATENT DOCUMENTS 5,311,594 A * 5/1994 Penzias ....................... 713/183
5,511,114 A   4/1996 Stimson et al.

(Continued)

OTHER PUBLICATIONS

High Beam Research Press Release 1 entitled "Shared Technologies Cellular Announces Universal Payment Method for Prepaid Wireless Services; ATCALL Becomes CellEase Distributor" Business Wire, Sep. 14, 1999, 2 pages.

(Continued)

*Primary Examiner*—Ahshik Kim
(74) *Attorney, Agent, or Firm*—Townsend and Townsend and Crew LLP

(57) ABSTRACT

In a relationship in which a customer has obtained a prepaid telecommunication services credit from a universal prepaid telecommunication services credit issuer (202), the issuer being a different entity than a telecommunication services provider (204), the present invention provides a method and system for fulfilling an account of a customer (208) with the provider using a card (100) of prepaid credit, which can be used to obtain prepaid telecommunication services from the provider.

69 Claims, 6 Drawing Sheets

U.S. PATENT DOCUMENTS

| | | | |
|---|---|---|---|
| 5,621,787 A | | 4/1997 | McKoy et al. |
| 5,684,291 A | * | 11/1997 | Taskett ................. 235/487 |
| 5,760,381 A | | 6/1998 | Stich et al. |
| 5,864,609 A | * | 1/1999 | Cross et al. ........... 379/114.13 |
| 5,991,380 A | * | 11/1999 | Bruno et al. ........... 379/114.15 |
| 6,000,608 A | * | 12/1999 | Dorf ..................... 235/380 |
| 6,032,136 A | | 2/2000 | Brake, Jr. et al. |
| 6,115,458 A | * | 9/2000 | Taskett ................. 379/114.2 |
| 6,185,545 B1 | | 2/2001 | Resnick et al. |
| 6,327,363 B1 | | 12/2001 | Henderson et al. |
| 6,386,457 B1 | | 5/2002 | Sorie |
| 6,581,827 B1 | | 6/2003 | Welton |
| 2001/0001856 A1 | | 5/2001 | Gould et al. |
| 2001/0034722 A1 | | 10/2001 | Tidball et al. |
| 2001/0037209 A1 | | 11/2001 | Tarbutton et al. |

OTHER PUBLICATIONS

High Beam Research Press Release 2 entitled "Shared Technologies Cellular Announces CellEase 2000: STC Forms CellEase.com, Inc." Business Wire, Dec. 16, 1999, 2 pages.

High Beam Research Press Release 3 entitled "Q Comm International Becomes CellEase Member, Gains Access to Universal Prepaid Services Platform; Also Offering CellEase Prepaid Serves As Agent for STC" Business Wire, Feb. 10, 2000, 2 pages.

Shared Technologies Cellular, Inc. document entitled "Nationwide Integrated Communications Program", Feb. 9, 2000, 17 pages.

* cited by examiner

METHODS AND SYSTEMS FOR FULFILLING A PREPAID TELECOMMUNICATION SERVICES ACCOUNT

CROSS-REFERENCES TO RELATED APPLICATIONS

This application is a continuation-in-part of U.S. patent application Ser. No. 09/939,519, filed on Aug. 24, 2001 now U.S. Pat. No. 6,581,827 and entitled "UNIVERSAL PREPAID TELECOMMUNICATION SERVICES CARD," of which the full disclosure is incorporated herein by reference for all purposes.

BACKGROUND OF THE INVENTION

The present invention relates generally to a prepaid telecommunication services credit, and more particularly to a universal prepaid telecommunication services credit that can be used for wireless, Internet, local telephone and long distance services for a plurality of service providers. The present invention also relates to systems and methods for implementing and fulfilling the prepaid telecommunication services credit.

Prepaid telecommunication services are becoming popular among many people, including immigrants, the credit challenged, teens, seniors, etc. Prepaid services for telecommunication products, such as wireless (cellular, PCS, GSM, etc.), Internet, and traditional telephone services, such as local and long distance telephone services are being offered by many service providers, and typically are provided by issuing prepaid calling or telecommunication cards to customers.

With prepaid telecommunication services currently known in the art, a customer typically purchases a prepaid calling card for the service, and when activated, the service provider credits the customer's account with the amount of the prepaid card. However, because there are a number of service providers, and each of those providers may be offering different services and amounts for each of those services, there are a large number of prepaid cards on the market. For example, companies like Qwest™, AT&T™, Sprint™, Verizon™, and others all may offer wireless, Internet and traditional telephone prepaid services, and each service may be offered with different prepaid amounts ($10, $20, $50, $100, etc.). With such large and diverse product offerings, service providers face difficult production and distribution problems. Moreover, retailers are concerned about carrying products, stock keeping units ("SKU") or uniform product codes ("UPC") for each service provider's different product offerings. As one skilled in the art will appreciate, if a retailer carried all the different product offerings, the prepaid cards probably would overtake a significant portion of the retailer's shelf space. Accordingly, retailers are hesitant to carry all the different product offerings from the different service providers, so the service providers are finding it difficult to get significant market penetration with their products.

Thus, what is needed is prepaid telecommunication services credit system and method that allows a single prepaid credit issuer to provide prepaid telecommunication services for multiple service providers, including a method and system for automatically fulfilling a customer account with a specified service provider.

BRIEF SUMMARY OF THE INVENTION

In a relationship in which a customer has obtained a prepaid credit for telecommunication services, including a preconfigured passcode, from a universal prepaid telecommunication services credit issuer, the issuer being a different entity than a telecommunication services provider, the present invention provides a method and system for fulfilling a customer account with the provider using the prepaid credit, which can be used to obtain prepaid telecommunication services from the provider.

In accordance with one embodiment of the invention, a method is provided, wherein a the issuer receives a communication from a customer, and the customer provides the passcode. Upon validating the passcode, the issuer associates the credit with an identifier and associates the prepaid credit with a particular provider. The credit issuer then fulfills an account with the particular provider, wherein the account is associated with the identifier and an amount equal to the credit is added to the account. In some embodiments, fulfillment is accomplished by off-line or by host-to-host transaction. In other embodiments, the provider fulfills the account.

In accordance with one embodiment, the passcode for the prepaid credit is selected from a group consisting of a serial number, a personal identification number, or a combination of a serial number and a PIN.

In accordance with other embodiments, the prepaid service can be wireless telephone service, long distance telephone services, local telephone service or Internet service. In one aspect of the invention, the communication from the customer is a telephone call, and the identifier may be a telephone number. The identifier can be the automatic number identification obtained by the issuer from the telephone connection used to contact the issuer; alternatively, the identifier obtained from the customer can be a mobile identification number or a telephone number different from the automatic identification. In another aspect, the communication is a network communication.

In some embodiments, a customer database is searched to determine whether the customer is a repeat customer. If so, a particular provider can be determined from a previous transaction history and the prepaid credit can be associated with the particular provider. If not, the customer database can be updated with a record including the identifier. In one embodiment, a cross-reference database of providers is searched to find a record comprising the identifier. In another embodiment, the issuer queries at least one provider to find a provider that acknowledges the identifier. The prepaid credit then is associated with the provider acknowledging the identifier. The query can be accomplished via host-to-host connection to the provider. In certain embodiments, the customer is allowed to choose a provider for fulfillment, for instance be selecting from among a menu of eligible providers.

In other embodiments, the customer is advised of the amount of credit to be added to the customer account and of when the credit will be added to the account. In still other embodiments, the issuer confirms the account fulfillment, for instance by creating a message and sending the message to the customer. In one embodiment, the message is a short messaging service message and the issuer transmits the message to a wireless device associated with the identifier.

In accordance with other embodiments, a system is provided. The system includes a processing system, a customer database in communication with the processing system, and a computer-readable medium, wherein the computer-readable medium includes instructions executable by the processing system to perform the method described above.

In accordance with another embodiment of the invention, a prepaid credit is provided. In one aspect, the prepaid credit is a tangible card. Alternatively, the prepaid credit can be a credit purchased on the Internet.

In accordance with other embodiments of the invention, a method is provided, whereby a card issuer provides a prepaid card having a identification number associated with the prepaid card. Upon receiving a prepaid card activation request from a card seller or distributor, the card issuer activates the prepaid card. After the card is activated, the card issuer can receive a request to use the card from a user. The card issuer then receives from the user the identification number associated with the prepaid card and validates the identification number. Upon validation of the identification number, the card issuer receives from the user a service request for a particular service provider. The card issuer then communicates the service request to the particular service provider.

In accordance with a certain embodiment, the identification number for the prepaid card comprises a card serial number, a card personal identification number, or a combination of a serial number and a PIN.

In accordance with another embodiment of the invention, the prepaid card comprises a magnetic strip or microchip for storing information, and the step of the card issuer activating the prepaid card further comprises a POS terminal reading card information from the magnetic strip or the microchip, the POS terminal transmitting the card information to the card issuer, and the card issuer activating the prepaid card based on the received card information.

In accordance with another embodiment of the invention, the prepaid card may have a predefined value assigned to is, or the value can be applied to the card at the time of purchase.

In accordance with another embodiment of the invention a system is provided for implementing the prepaid card.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
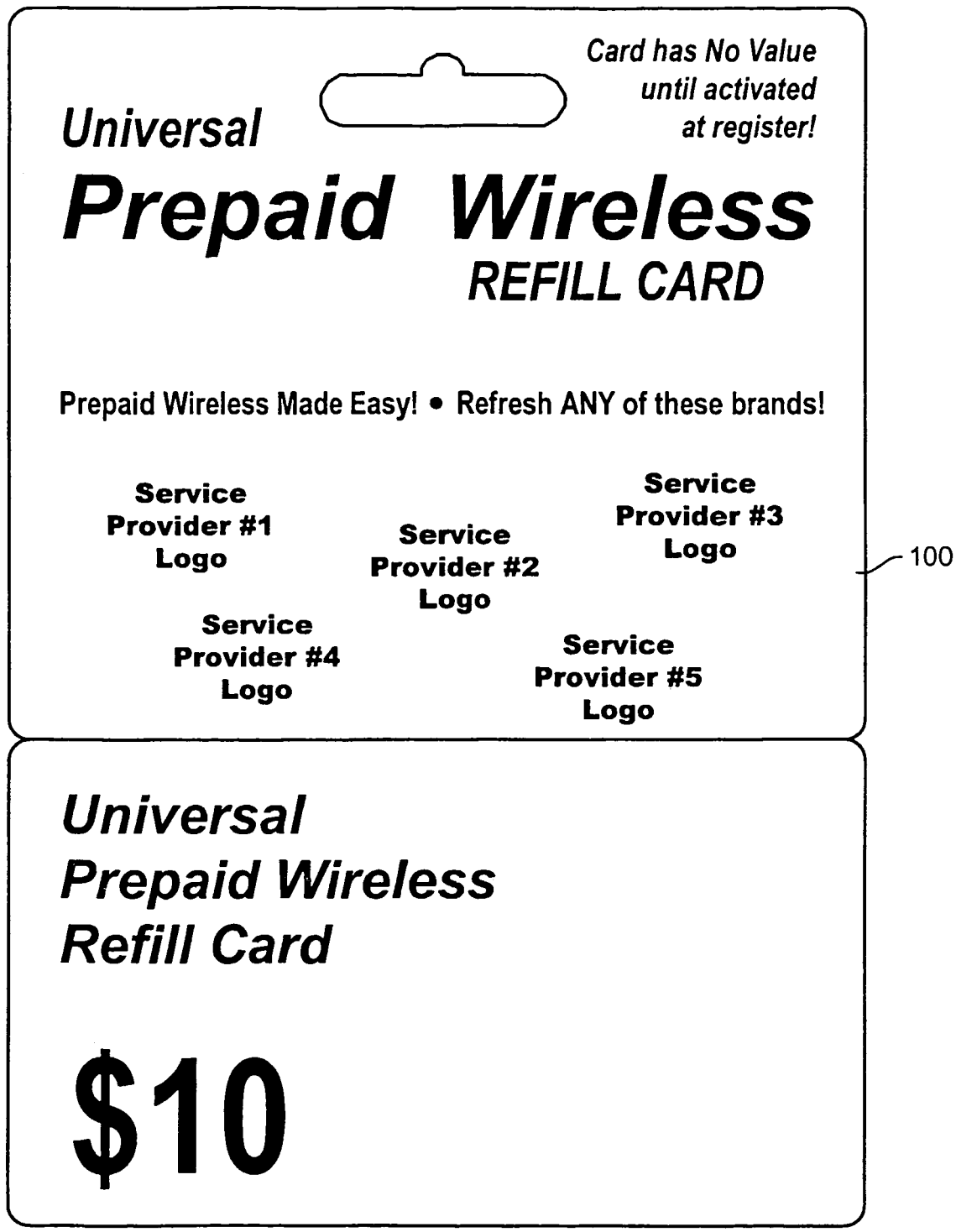
FIG. 1 is a picture of one embodiment of a universal prepaid telecommunication services card.

Rather than each service provider issuing separate prepaid calling cards for each of its service offerings, the present invention proposes use of a single prepaid telecommunication services credit ("prepaid credit"), which can be used to replenish telecommunication service accounts from any number of carriers or providers. In some embodiments, the prepaid credit comprises a prepaid telecommunications services card 100 ("prepaid card 100"), as shown in FIG. 1. Thus, a retailer needs to stock only one card, rather than separate cards for each carrier and service offering. In one embodiment of the present invention, the value of the prepaid credit may be assigned at the time of sale. In accordance with another embodiment of the invention, the value of the prepaid credit is fixed and may be printed on prepaid card 100. In the embodiment in which the value of prepaid credit is fixed, the retailer may stock one set of cards for each value denomination.

Figure 2:
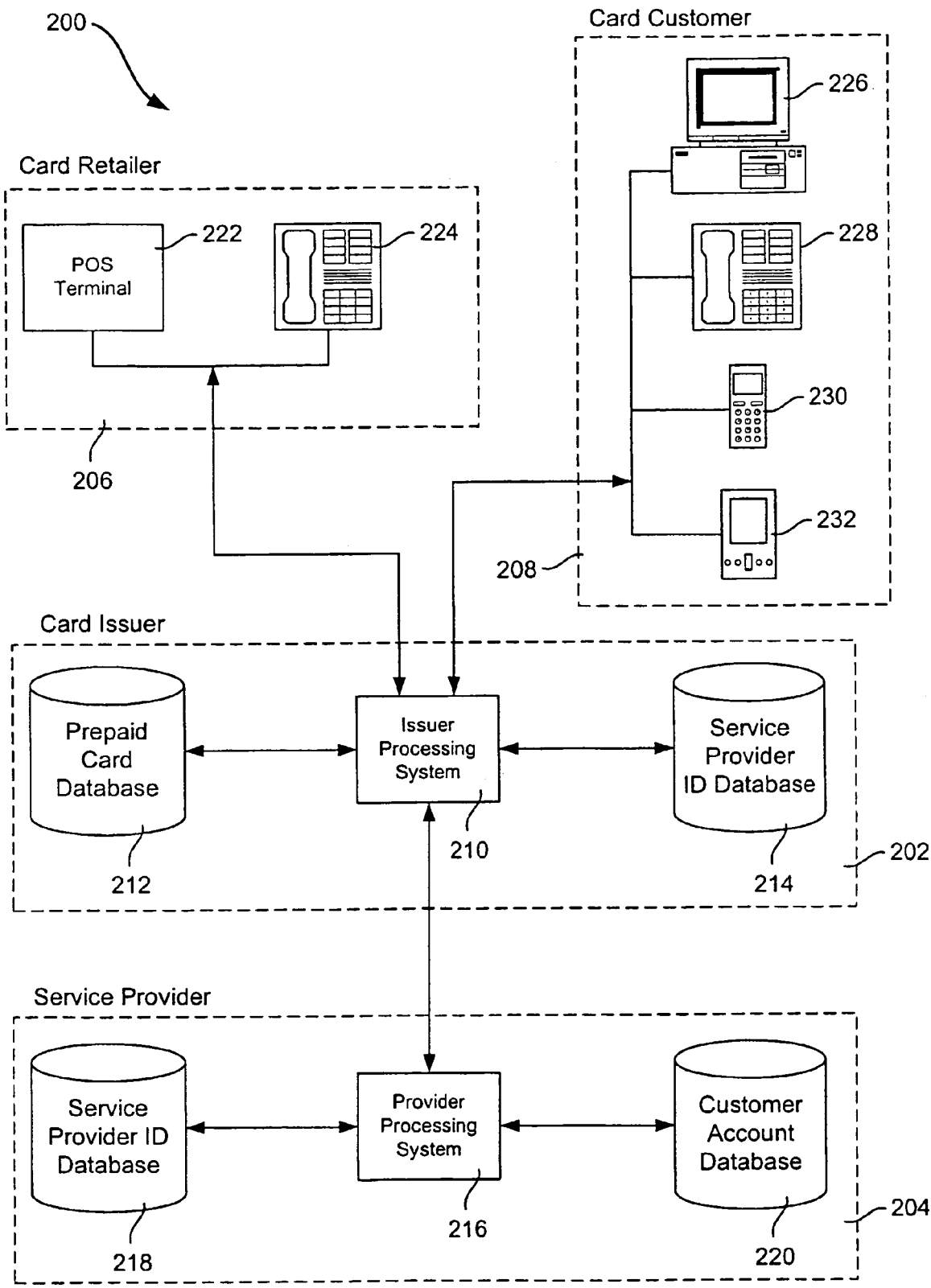
FIG. 2 is a block diagram of one embodiment of a network of systems that can be used to implement a universal prepaid telecommunication services credit in accordance with the present invention.

Referring now to FIG. 2, one embodiment of a system and network 200 for implementing a prepaid credit in accordance with the present invention is illustrated. For ease of description, the prepaid credit in the described embodiment comprises prepaid card 100; however, as described in detail below, the prepaid credit can also take a variety of other forms. In the illustrated embodiment, system 200 comprises a prepaid telecommunications credit issuer 202 ("issuer 202" or "card issuer 202"), a telecommunication services provider 204 ("provider 204" or "service provider 204"), a card retailer 206, and a customer 208.

In one embodiment, issuer 202 is an entity responsible for printing, distributing and implementing prepaid cards 100. Issuer 202 comprises an issuer processing system 210 for validating and processing prepaid cards 100. Issuer processing system 210 may comprise any suitable processing system, such as a personal computer, a computer server, a mainframe or minicomputer system, or the like. In addition, issuer processing system 210 may comprise an interactive voice response (IVR) unit for processing telephone calls and/or modems, hubs, routers, switches or other networking hardware for receiving data from card retailers 206 and/or customers 208. Associated with issuer processing system 210 may be a prepaid card database 212, and a service provider ID database 214. As discussed in more detail below, prepaid card database 212 and service provider ID database 214 are used in the validation and implementation process for prepaid credits.

Provider 204 may be any service provider that provides telecommunication services, such as wireless service, Internet service, local telephone service, long distance telephone service, or any other telecommunication services that may be provided in a prepaid manner. In one embodiment, provider 204 works with issuer 202 to provide prepaid telecommunications services. As discussed in more detail below, issuer 202 issues prepaid credits (for example, prepaid cards 100), and when prepaid credits are activated, communicates with provider 204, so that a customer's telecommunication service account is fulfilled. As used herein, the term "fulfill" means any transaction whereby a prepaid telecommunications service account is credited in an amount equal to a prepaid credit. Provider 204 comprises a provider processing system 216 for communicating with issuer 202 and for processing prepaid credit services. Like with issuer processing system 210, provider processing system 216 may comprise any suitable processing system and may include communications equipment for communicating with issuer 202, such as IVR systems, modems, hubs, routers, switches, etc. Provider 204 also may include a service provider identification database 218 and a customer account database 220, for processing prepaid telecommunication services requests.

Card retailer 206 may be any entity that sells or distributes prepaid credits to customers 208. In some embodiments, as discussed in more detail below, when a customer purchases a prepaid card 100 from the retailer, the retailer activates the card using a point-of-sale (POS) terminal 222, a telephone 224, or some other communication means (e.g., wireless phone, computer terminal, etc.). As illustrated in FIG. 2, POS terminal 222 and telephone 224 are configured to communicate with issuer processing system 210 at issuer 202.

Customer 208 may be any individual or entity that purchases or otherwise obtains a prepaid credit. In one embodiment, after customer 208 purchases a prepaid credit, customer 208 communicates with issuer 202 to activate the credit for a particular telecommunication service account of customer 208 and to fulfill the account. As discussed in more detail below, this typically requires customer 208 to provide a serial number and/or a PIN associated with the prepaid credit, as well as customer account information, to issuer 202, and more particularly to issuer processing system 210. To communicate information to issuer processing system 210, customer 208 may use any suitable communication device, such as a computer 226, a telephone 228, a cell phone 230, a personal digital assistant ("PDA") 232, or the like. For example, customer 208 may use telephone 228 or cell phone 208 to contact issuer 202, and in particular issuer processing system 210, via a telephone call, or alternatively, customer 208 may use computer 226, cell phone 230 or PDA 232 to transmit a network communication to issuer processing system 210. As used in this document, the term "network communication" means any suitable means of electronic communication known to those skilled in the art, including for example, direct wired communication, wireless communication, and communication over the Internet (for example, electronic mail), via the World Wide Web, or through any other computer or telecommunication network (for example, a local area network, a wide area network, a virtual private network or the public switched telephone network).

Figure 3:
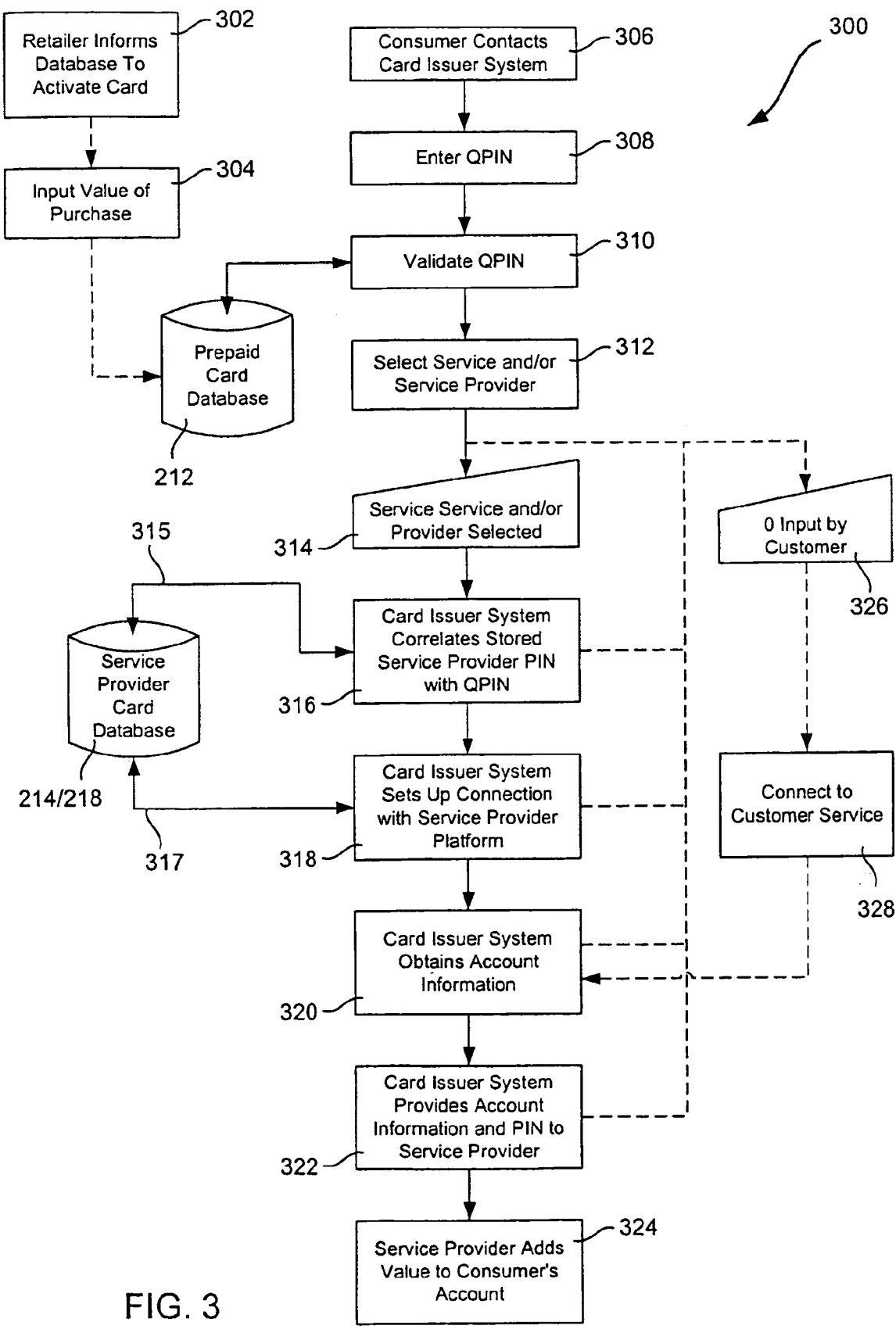
FIG. 3 is a flow chart illustrating one embodiment of a method for implementing the universal prepaid telecommunication services card of the present invention.

Referring now to FIG. 3, a flow chart 300 illustrating one embodiment of a method for implementing prepaid card 100 is shown. Other embodiments implement similar methods with other forms of prepaid credits described in detail below. In implementing prepaid telecommunication services cards 100, the cards typically are sold or distributed to customers 208 by retailers 206, such as grocery stores, convenience stores, gas stations, or other retail outlets. Upon the sale of a prepaid card 100, retailer 206 typically activates prepaid card 100 with card issuer 202. In one embodiment of the invention, each prepaid card 100 has a unique identification or serial number and a PIN assigned to it by card issuer 210. The serial number and PIN for each card are stored at card issuer 202, for example in card database 212. To activate a prepaid card 100, card retailer 206 communicates the card serial number (and perhaps PIN) to issuer processing system 210 at card issuer 202, informing issuer processing system 210 that prepaid card 100 was legitimately sold to a customer (block 302).

In one embodiment, card retailer 206 activates a prepaid card using a POS terminal 222 at the retailer location. For example, prepaid card 100 may include a magnetic strip, bar code or microchip, which stores card information, such as card serial number, PIN number, monetary value of the prepaid card, etc. In this embodiment, POS terminal 222 is configured to read the relevant information from the magnetic strip, bar code or microchip on the card and transmit that information over a communication link to issuer processing system 210 and database 212. As one skilled in the art will appreciate, the communication link between POS terminal 222 and issuer processing system 210 may be any suitable communication link, such as a telephone line, a direct data connection, a wireless or satellite connection, or the like.

In an alternative embodiment of the invention, prepaid card 100 may not have a specific monetary denomination associated with it. In this embodiment, a customer pays card retailer 206 a monetary amount, and retailer 206 assigns that amount to the card. In one embodiment, to assign an amount to the card, retailer 206 has a POS terminal 222 that writes the amount on the magnetic strip or microchip of the card and/or communicates that amount to issuer processing system 210 and database 212 using the communication link (block 304). In another embodiment, POS terminal 222 merely communicates the amount to issuer processing system 210, but does not write the amount on the card (alternative block 304). The particular procedure used is not important so long as the customer receives the appropriate credit for which he paid.

As one skilled in the art will appreciate, some retail locations may not have POS terminals 222. Thus, in accordance with another embodiment of the invention, retailer 206 communicates card information to issuer processing system 210 and database 212 using a computer terminal or telephone. In the case where a telephone is used, issuer processing system 210 may include an interactive voice response ("IVR") unit or voice recognition unit, which automatically receives the necessary information from the retailer's voice or DTMF responses from the telephone.

When a customer 208 wishes to use prepaid card 100, customer 208 contacts card issuer 202, and more particularly issuer processing system 210 of card issuer 202 (block 306). As discussed above, customer 208 communicates with issuer processing system 210 using any suitable communication device, such as a computer 226, a telephone 228, a cell phone 230, a PDA 232, or the like. If a telephone or cell phone is used, issuer processing system 210 may comprise an IVR or voice recognition unit as discussed above to communicate with customer 208.

After connecting to issuer processing system 210, customer 208 enters a card serial number and/or PIN associated with prepaid card 100 (block 308). Issuer processing system 210 then validates the information by checking prepaid card database 212 (block 310). In one embodiment, issuer processing system 210 uses the card serial number to extract a record from database 212, and confirm that the entered PIN is valid for the entered card serial number. In addition, issuer processing system 210 validates that prepaid card 100 was activated by a retailer 206; i.e., that the card was not stolen.

In one embodiment, upon validating the card and PIN, issuer processing system 210 prompts customer 208 to select a service for which he or she wants to use prepaid card 100, as well as a service provider to provide that service (blocks 312-314). For example, customer 208 may select prepaid wireless calling services to be provided by AT&T Wireless™, prepaid Internet services to be provided by MCI Worldcom™, prepaid local or long distance services to be provided by Qwest Communications™, or any other combination of service and service provider. After customer 208 has selected the service and provider, issuer processing system 210 obtains a service ID number associated with the service, provider and/or monetary amount combination. For example, in one embodiment, a service provider such as Qwest Communications™ may have service ID numbers associated with each of its service offerings and monetary value combinations (e.g., wireless $10, wireless $20, long distance $50, local phone service $25, etc.) In an alternative embodiment, providers may have service ID numbers associated with each service offering (e.g., wireless, Internet, long distance, local phone service, etc.), but no monetary value associated with the service. In this embodiment, card issuer 202 communicates the monetary value of the card to service provider 204 based on the preset monetary value of the card, or the value assigned to the card by card retailer 206 at the time of purchase. In either case, the service ID numbers are stored in a database.

In one embodiment, service providers 204 may provide the service ID numbers to card issuer 202 to be stored and accessed in service provider ID database 214 located at the card issuer. In accordance with this embodiment, issuer processing system 210 obtains a service ID number from database 214 (block 316) and then connects to service provider processing system 216 for further processing (step 318). The connection between issuer processing system 210 and database 214 is illustrated in FIG. 3 by line 315.

In accordance with an alternative embodiment of the invention, instead of card issuer 202 storing the provider's service ID numbers locally (e.g., in database 214), card issuer 202 may be configured to access the service ID numbers stored at service provider 204, for example in service provider database 218 (illustrated as block 318). In accordance with this aspect of the present invention, issuer processing system 210 accesses database 218, for example through the provider processing system 216. The connection between issuer processing system 210 and database 218 is illustrated in FIG. 3 by line 317. If this particular embodiment is used, the connection between card issuer 202 and service provider 204 can be maintained for further processing (block 318).

As one skilled in the art will appreciate, to use a prepaid credit for any given service, a customer typically has an account with a service provider for a particular service or establishes an account prior to using the prepaid card. For example, for wireless service, a customer needs a wireless phone (cellular, PCS, GSM, etc.) to make calls. Typically, the customer will purchase or be given a phone for use with one or more service providers. At the time the customer receives the phone, the customer typically establishes an account with the one or more service providers with which the phone can be used. The same also holds true for other telecommunication services. Internet, local phone, and long distance service providers all require customers to establish accounts before they will provide service. In one embodiment, a customer establishes an account with a service provider by contacting the service provider directly. In another embodiment, the system of the present invention can be used to assist a customer in establishing an account with a service provider for a particular service.

If a customer 208 has an established account for the service/service provider selected in block 312, customer 208 is prompted to enter additional information, such as customer account information (block 320). In one embodiment, issuer processing system 210 at issuer 202 prompts customer 208 to enter the information, and then passes the information to provider processing system 216 at service provider 204. In accordance with this embodiment, issuer processing system 210 receives account information from customer 208, establishes a connection with service provider 204, and then passes the account information to service provider 204, along with the service ID associated with the selected service, service provider and monetary amount (block 322). Upon receiving the account and service ID information from card issuer 202, provider processing system 216 validates the information by accessing service provider ID database 218 and customer account database 220. If the customer account and service ID information is valid, provider processing system 216 at service provider 204 fulfills the customer's service account with the monetary value of the prepaid credit purchased by the customer. Provider processing system 216 then informs issuer processing system 210 at card issuer 202 that the customer's account was credited. Issuer processing system 210, in turn, notifies the customer.

In accordance with another embodiment of the invention, instead of issuer processing system 210 at issuer 202 connecting to provider processing system 216 after it obtains the customer's account information, issuer processing system 210 may connect to provider processing system 216 before customer account information is obtained. In accordance with this embodiment of the invention, issuer processing system 210 passes account the information from customer 208 to service provider 204 via the telecommunication connection. For example, issuer processing system 210 may receive account information and send it directly to service provider 204, or issuer processing system 210 may establish a 3-way call with provider processing system 216 at service provider 204 and customer 208. With a 3-way call, either issuer processing system 210 or provider processing system 216 may be configured to prompt customer 208 to enter account information. In either case, the account information, along with the service ID is passed to provider processing system 216 for processing as discussed above. As one skilled in the art will appreciate, the specific configuration and method by which account and service ID information is passed from card issuer 202 to service provider 204 is not important, so long as the information arrives at the service provider, is validated, and the customer account is fulfilled.

If customer 208 purchases a prepaid card 100, but does not have an account established with a service provider, customer 208 is informed of that fact when service provider 204 attempts to validate the customer account information. If this occurs, customer 208 is instructed to set-up an account by contacting provider 204 directly or by working through a customer service agent at issuer 202. Alternatively, issuer processing system 210 may be configured to establish service provider accounts, or issuer processing system 210 may connect customer 208 to provider processing system 216, so that it can establish the account. The particular process of how an account is established is not important. Once the account is established, however, customer 208 can use the system of the present invention to implement the prepaid credit.

As illustrated in FIG. 3., if at any step during the prepaid card validation process, a customer has a problem or would like to speak with a customer service agent, the customer can press a predetermined key (such as "0") (block 326) and the customer is transferred to a customer service agent (block 328). In addition, all other IVR and computing system functionality may be incorporated into the system of the present invention.

Figure 4:
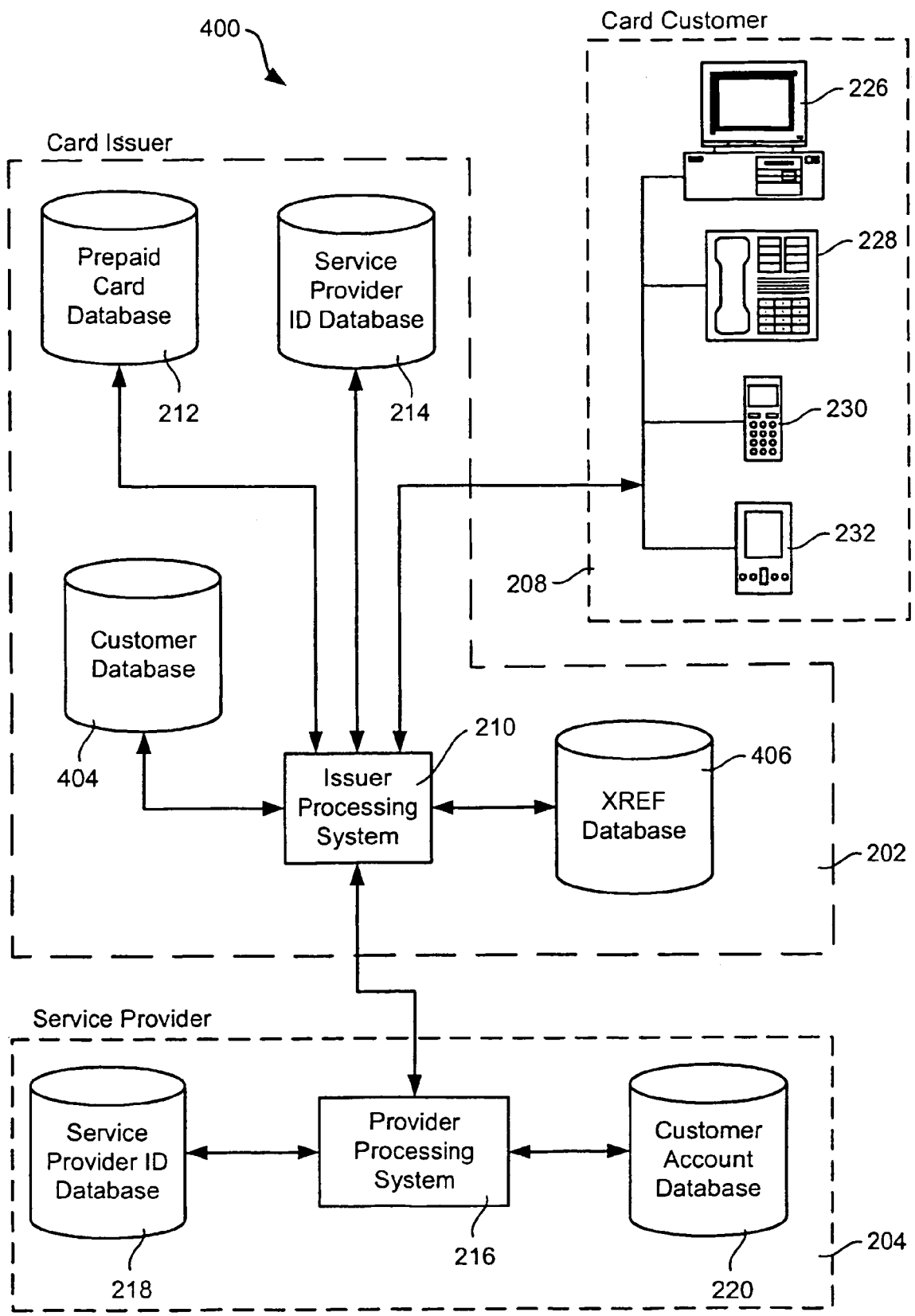
FIG. 4 is a block diagram of one embodiment of a network of systems that can be used to fulfill a universal prepaid telecommunication services credit in accordance with the present invention.

FIG. 4 illustrates a system and network 400 for fulfilling a prepaid credit according to another embodiment of the present invention. As described in detail above, a prepaid credit may comprise a prepaid card, such as the one illustrated in FIG. 1. In addition, prepaid credit may take one of a variety of other forms, including for example, a virtual card, an insert sold with a telecommunications device, for instance a wireless phone, or a paper receipt. According to one embodiment, issuer 202 is in communication with provider 204 and customer 208. It is assumed that customer 208 already has purchased or otherwise obtained an activated prepaid credit, perhaps using one of the methods described above. After obtaining the prepaid credit, customer 208 must contact issuer 202 to fulfill the credit, a process that will be described by reference to FIGS. 5 and 6. As described above, customer 208 may communicate with issuer 202 through a variety of methods.

Also as described above, issuer 202 may be an entity responsible for printing and distributing prepaid cards 100. Alternatively, issuer 202 may be a manufacturer, distributor or retailer of telecommunications devices or any other entity responsible for facilitating the fulfillment of prepaid credits. In the present embodiment, issuer 202 comprises issuer processing system 210, described in detail above. In addition, issuer 202 may include prepaid card database 212, service provider identification database 214, customer database 404 and/or cross reference database 406. The functions of each of those databases in accordance with one embodiment of the invention will be described in detail below.

Issuer 202 is in communication with service provider 204, which comprises a provider processing system 216, as described above. Those skilled in the art will recognize that such communication may take a variety of forms, including host-to-host transactions between issuer processing system 210 and provider processing system 216; host-to-host transactions between issuer processing system 210 and a telecommunications switch (not shown) operated by service provider 204; other forms of electronic communication, including, for example the transfer of extensible markup language ("XML") files or electronic mail; facsimile communication; and telephone communication between employees of issuer 202 and service provider 204, respectively.

As used in this document, the term "host-to-host connection" and "host-to-host transaction" mean any direct or indirect communication, established by any suitable method familiar to those skilled in the art, between issuer processing system 210 and any telecommunications or computer system operated by provider 204 or a third party, including without limitation, mainframe computers, minicomputers, personal computers, telecommunications switches, and any other component of an intelligent network ("IN").

In some embodiments, service provider 204 also might comprise a service provider identification database 218 and customer account database 220, each associated with provider processing system 216. The functions of each of those databases in accordance with one embodiment of the invention will be described in detail below.

Figure 5:
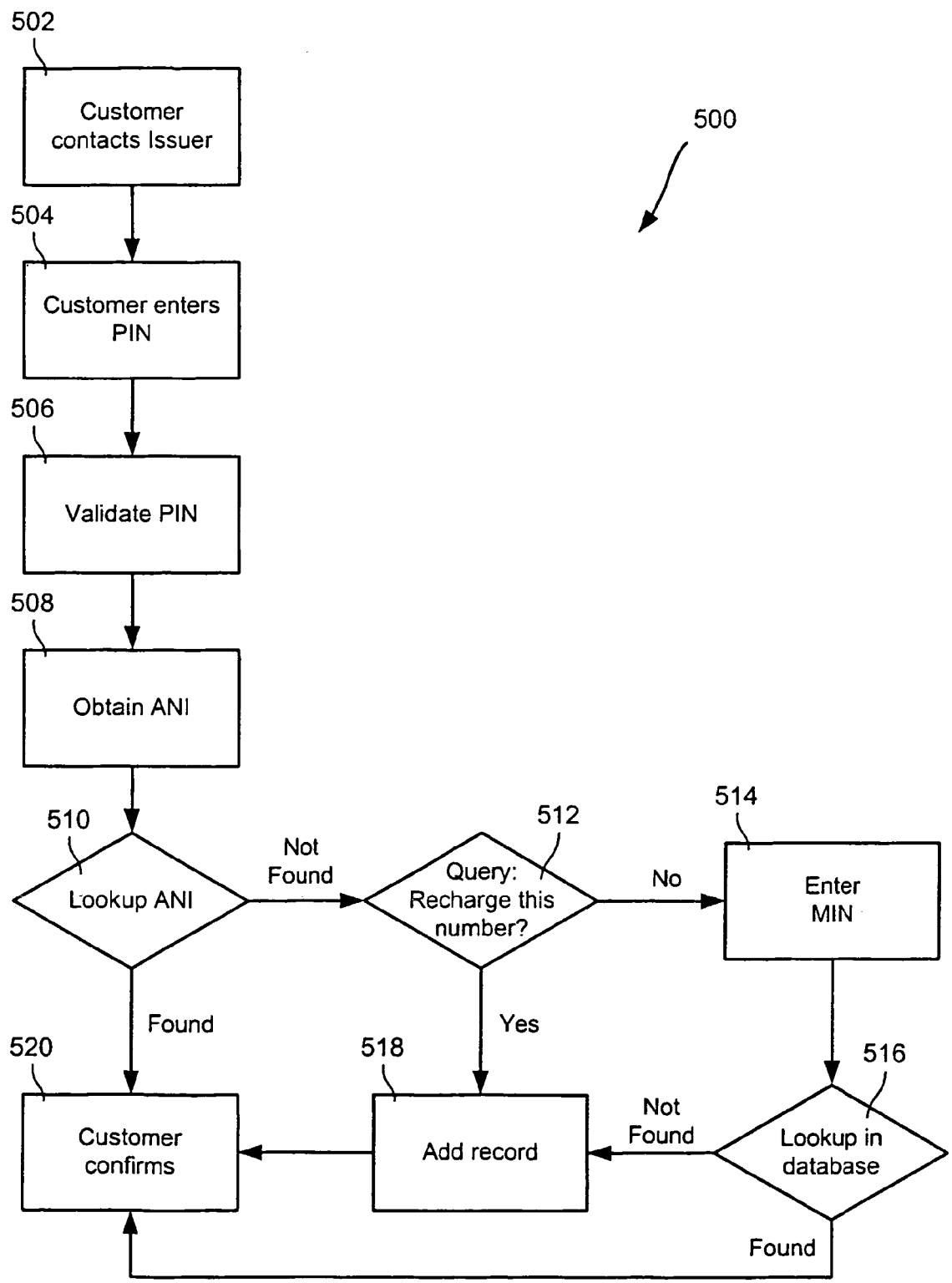
FIG. 5 is a flow chart illustrating one embodiment of a method for obtaining a provider-specific identifier in accordance with one embodiment of the invention.
Figure 6:
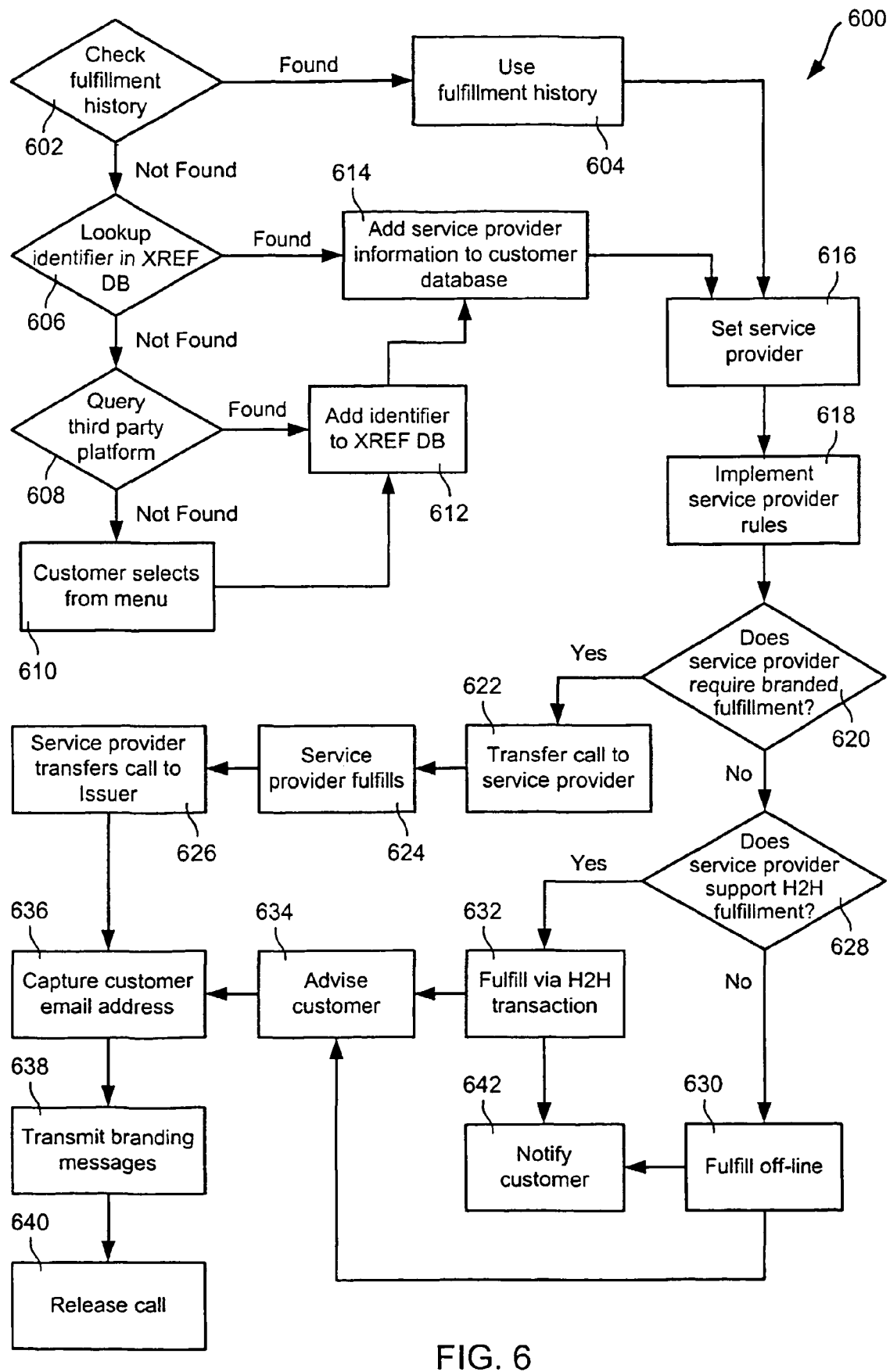
FIG. 6 is a flow chart illustrating the fulfillment of a universal prepaid telecommunication services credit according to one embodiment of the invention.

FIGS. 5 and 6 together illustrate one embodiment for fulfilling a prepaid credit for telephone service according to one embodiment of the invention. The illustrated embodiment is particularly advantageous with respect to prepaid wireless phone service. Referring to FIG. 5, a flow chart 500 illustrating one embodiment for establishing a provider-specific identifier ("identifier") will be described. As used herein, a provider-specific identifier may be any string of characters by which a service provider 204 may identify a customer account or a service associated with such an account. In one embodiment, the identifier will be specific to a particular service provider 204, so that issuer 202 may identify the appropriate provider for a transaction by referencing the identifier, as described in detail below. In certain embodiments the identifier is the telephone number associated with customer account. According to one embodiment, after customer 208 has obtained a prepaid credit, customer contacts issuer 202, and in particular, issuer processing system 210 (block 502) to begin the fulfillment process. As described above, such contact may be conducted through one of a variety of methods; in some embodiments, customer 208 contacts issuer 202 using a telephone, either a traditional telephone 228 or a wireless phone 230, and issuer processing system 210 further comprises an IVR. In one embodiment, customer 208 may contact issuer 202 by entering a preconfigured string on a wireless phone. For purposes of this document, the term "preconfigured string" means a specific series of buttons on the wireless phone preprogrammed by a wireless carrier, using methods known to those skilled in the art, that when pressed in the proper order will connect customer 208 to issuer 210, including for example "star" and "pound" numbers like "*729," which corresponds to the letters "PAY."

Upon initiating the contact, customer 208 is prompted by issuer processing system 210 to enter a passcode, which identifies the credit and confirms the right of customer 208 to use the prepaid credit (block 504). A passcode is any string of characters that enables issuer 202 to identify and/or validate the prepaid credit, and it may comprise a serial number and/or PIN, both of which are described in detail above. Those skilled in the art will recognize that entry of the passcode may be accomplished through a variety of methods. For instance, in one embodiment, entry may be accomplished by pressing the numeric keys on the keypad of the wireless telephone 230 or telephone 228 used to contact issuer processing system 210. Alternatively, entry may be accomplished by customer 208 speaking the individual characters of the passcode; the IVR of issuer processing system 210 can convert the spoken characters into data. If computer 226 or PDA 232 is used to contact issuer processing system 210, entry may be made using the data input facilities of those devices. In one embodiment, issuer processing system 210 echos the entered characters to customer 208 to confirm the accuracy of the entry.

Issuer processing system 210 validates the entered passcode (block 506), for example, by comparing the passcode to values stored in prepaid card database 212. Those skilled in the art will recognize that other methods of validation are possible as well, for instance, processing the entered passcode with a mathematical algorithm and examining the result to determine whether the entered values are valid. As described above, validation also might include determining whether the prepaid credit was activated by the retailer at the time of purchase, for example to prevent the unauthorized use of stolen credits, and/or determining whether the credit already has been fulfilled, to prevent multiple uses of the same credit.

In one embodiment, issuer processing system 210 obtains the automatic number identification ("ANI") of the phone used by customer 208 to contact issuer processing system 210 (block 508). Those skilled in the art will recognize that there are a variety of commercially-available methods to obtain the ANI of a calling phone. Upon acquiring the ANI, issuer processing system 210 searches customer database 404 for records matching the ANI (block 510). If no record matches the ANI of the customer's phone, issuer processing system 210 asks customer 208 whether customer 208 is calling from the phone associated with the prepaid account to be fulfilled (block 512). If customer 208 is not calling from the phone associated with the account to be fulfilled, issuer processing system 210 prompts customer 208 to enter the identifier of the account for which prepaid fulfillment is desired. In one embodiment, the identifier may be the mobile identification number ("MIN") of the wireless phone associated with the account. In another embodiment, the prepaid account to be fulfilled might not be affiliated with a wireless phone but might instead be a prepaid long distance account associated with a traditional telephone line, as disclosed in commonly-assigned U.S. patent application Ser. No. 09/565, 311, entitled "PREPAID LONG DISTANCE CALL SYSTEM AND METHOD" and filed May 4, 2000, the complete disclosure of which is incorporated by reference herein, in which the identifier might be the telephone number associated with the prepaid long distance account to be fulfilled. Alternatively, the identifier can be a unique string of text and/or numbers assigned by provider 204 to identify the customer account.

Once customer 208 enters the MIN (block 514), issuer processing system 210 searches customer database 404 for a record matching the entered MIN (block 516). If no record exists, issuer processing system may create a record in customer database 404 comprising the entered MIN (block 518). Likewise, if customer 208 indicates that he or she is calling from the wireless phone associated with the prepaid account to be fulfilled and issuer processing system 210 fails to find a corresponding customer database record, issuer processing system 210 creates a record in customer database 404 comprising the ANI of customer's phone (block 518). In some embodiments, if a new customer database record is created, issuer processing system 210 prompts customer 208 to enter additional identifying information (e.g. name, address, etc.) and adds that information to the new record.

Once issuer processing system 210 has obtained the ANI or MIN (or other identifier) associated with the prepaid account to be fulfilled, it confirms the identifier (block 520), for example by repeating the obtained value to customer 208 and allowing customer 208 to confirm the obtained value (for example, by pressing "1" on the phone keypad in response to a prompt from issuer processing system 210). Thus, in some embodiments, the identifier is the telephone number associated with the account to be fulfilled.

Referring now to FIG. 6, a flowchart 600 illustrates the remainder of the fulfillment process according to one embodiment of the invention. After obtaining the identifier, issuer processing system 210 checks the customer database information associated with the identifier for any related fulfillment history (block 602). If customer 208 is a repeat customer (i.e., has conducted one or more fulfillment transactions in the past), the customer database information might contain a fulfillment history for the customer. If the customer is a repeat customer, issuer processing system 210 obtains from the customer database information or fulfillment history (if available) the most recent service provider 204 associated with customer's 208 account (block 604). In some embodiments, the fulfillment history also includes details about the specific method of fulfillment; for example, the fulfillment history might include a notation that the account was fulfilled last time via a host-to-host transaction, or via an operator call to provider 204. In one such embodiment, issuer processing system 210 uses such details automatically to select the fulfillment method for the current transaction. In other embodiments, if the fulfillment history includes more than one method of fulfillment, issuer processing system 210 selects the most recent or the most efficient fulfillment method from among the methods in the fulfillment history. In still other embodiments, if the fulfillment history indicates that only relatively inefficient fulfillment methods have been used to fulfill customer's 208 account in the past, issuer processing system 210 will ignore the fulfillment history and attempt to complete the fulfillment transaction using a more efficient method.

In some embodiments, if the customer database information comprising the identifier contains no fulfillment history, issuer processing system 210 searches cross-reference database system 406 for a record containing the identifier (block 606). Although, illustrated as a single database for ease of reference, cross-reference database system 406 can be any database implementation that allows issuer 202 to determine whether customer 208 is a subscriber of a particular service provider 204. For instance, cross reference database system 406 may be a database maintained by issuer 202 containing customer records for a variety of different providers 204. Alternatively, cross-reference database system 406 may be a plurality of databases containing the subscribers of individual providers 204. Those skilled in the art will recognize that a variety of other database implementations also will accomplish this function.

In one embodiment, if no records containing the provider-specific identifier are found in cross-reference database system 406, issuer processing system 210 queries providers 204 directly (block 608). Such queries may be performed in parallel across the platforms of several providers 204 simultaneously or may be performed sequentially, with each provider 204 queried in turn. Those skilled in the art are familiar with the wide variety of multi-source search algorithms that have been developed.

The query of an individual provider 204 may be accomplished by any of several methods. For instance, in one embodiment, issuer processing system 210 queries provider processing system 216 whether a particular identifier is associated with a subscriber account with that provider 204. The query may be performed through any of a variety of electronic communications, including submission of an SQL query, transfer and/or parsing of XML files or electronic messages, and the like; moreover, such communications may be transmitted over the Internet, through proprietary networks, or via other means familiar to those skilled in the art. The method of performing the query is unimportant as long as both issuer 202 and provider 204 understand the query and the response.

Provider processing system 216 responds to the query, either by searching its own customer account database 220 or through some other means. Those skilled in the art will appreciate, for example, that wireless phone service providers employ a variety of methods, both industry-standard and proprietary, to determine whether a given MIN is served by a particular provider. The method by which service provider 204 determines whether customer 208 is a subscriber of that service provider 204 is immaterial to the scope of this invention, as long as service provider 204 responds to issuer processing system's query.

In one aspect of the invention, service provider 204 allows issuer processing system 210 directly to access service provider's 204 telecommunications switch (not shown), allowing issuer processing system 210 to establish a host-to-host connection with the switch. Using the host-to-host connection, issuer processing system 210 directly may query the switch to determine whether the switch recognizes the provider-specific identifier. If the switch does acknowledge the provider-specific identifier, issuer processing system 210 determines that customer 208 is a subscriber of service provider 204 operating that switch.

In other embodiments, the query involves human operators. For instance, in one embodiment, an employee of issuer 202 calls an operator at service provider 204 and asks whether the provider-specific identifier is affiliated with service provider's 204 system. Alternatively, an employee of issuer 202 might perform the electronic query described above.

If, however, neither a search of the cross-reference database 406 nor a query of service providers reveals the appropriate service provider 204 for a given identifier, issuer processing system 210 queries customer 208 to select the proper service provider 204. In one embodiment, customer 208 may select the appropriate service provider 204 from a menu of available service providers (block 610). For instance, issuer processing system 210 may prompt customer 208 to "press '1' if your wireless provider is Qwest Wireless™, press '2' if your wireless provider is AT&T Wireless™, press '3' if your wireless provider is Verizon Wireless™, or press '0' if did not hear the name of your wireless provider." As discussed in detail above, customer 208 may press a predefined escape key (for instance, "0") at any time during the fulfillment transaction to speak with an operator. If customer 208 presses the escape key at this point, an operator may assist customer 208 in choosing the proper service provider 204.

Those skilled in the art will recognize that there are other methods of prompting customer 208 to provide the name of the proper provider 204. For instance, issuer processing system 210 might prompt customer 208 to input the first few letters of service provider's name, using either the telephone keypad or any other data input method supported by the mode of communication between customer 208 and provider 202, as discussed above. Alternatively, issuer processing system 210 might prompt customer 208 to speak the name of the appropriate service provider 204. The IVR associated with issuer processing system 210 would then translate the customer's spoken response to data for interpretation by issuer processing system 210.

In certain embodiments, regardless of the method by which the query is performed, if a particular service provider 204 acknowledges that the identifier corresponds to a subscriber account on its system (block 608), or alternatively, if customer 208 selects the proper provider 204 (block 610), issuer processing system 216 adds a record to cross-reference database system 406 linking the identifier with that particular service provider (block 612). In this way, if the same customer 208 initiates another fulfillment transaction in the future, issuer processing system 210 need not repeat the query process. Similarly, in some embodiments, if the appropriate service provider 204 for a particular identifier is found, either thorough a search of cross-reference database system 406 (block 606), through a query of provider platforms (block 608) or by customer selection (block 610), information about the service provider is added to the fulfillment history in the customer database record comprising with that identifier (block 614), so that future fulfillment requests for that customer 208 may be processed without having to search for the proper service provider 204.

After the appropriate service provider 204 has been selected, either through checking the fulfillment history of the customer database record for the provider-specific identifier (block 604), by look-up in the cross-reference database system (block 606), through querying service providers 204 (block 608), by customer selection (block 610) or through any other means, issuer processing system 210 sets the selected service provider as provider 204 for the fulfillment transaction (block 616). As discussed above in the context of setting the provider-specific identifier (block 522), setting the service provider may be accomplished implicitly or explicitly. However accomplished, setting the service provider allows issuer processing system 210 to proceed with the fulfillment transaction with the proper provider 204.

According to one embodiment, issuer processing system 210 then implements any specific service provider rules (block 618). Service provider rules can be any additional procedure requested or required by provider 204 as part of the fulfillment transaction. For instance, some providers 204 might require customer 208 to provide an additional, provider-specific PIN prior to allowing the fulfillment transaction. Implementing the service provider rules may force customer 208 to enter the correct PIN, which optionally could be verified by an additional communication between issuer processing system 210 and provider 204 before allowing the fulfillment transaction to proceed. Other providers might associate a particular identifier with more than one customer account (for instance, a prepaid wireless account and a prepaid long distance account); implementing the service provider rules for such a service provider 204 would allow customer 208 to choose which account to fulfill. Other service provider rules are possible without varying from the scope of the invention. Service provider rules may be stored by issuer 202, for instance in service provider identification database 214; alternatively, provider 204 can transmit any service provider rules to issuer 202 as it responds to the query from issuer 202 described above or during any other communication between issuer 202 and provider 204.

In some embodiments, provider 204 might require branded fulfillment, whereby provider 204 itself performs the fulfillment transaction, for example, in order to maintain a consistent public presence. In this way a customer of, e.g., AT&T Wireless™ can speak directly with an AT&T operator during the fulfillment process. If provider 204 requires branded fulfillment (block 620), issuer processing system 210 transfers the call to provider 204 (block 622), which then performs the fulfillment transaction (block 624). In one embodiment, an operator of service provider 204 completes the fulfillment manually by adding the prepaid credit to the proper customer account. In another embodiment, service provider 204 implements its own automatic fulfillment application. The method used by provider 204 to complete the fulfillment transaction is not important so long as the proper customer account is credited with the proper amount. After fulfilling customer's 208 account, provider 204 transfers the call back to issuer processing system 210.

In other embodiments, if provider 204 does not require branded fulfillment, issuer processing system 210 checks whether provider 204 supports host-to-host fulfillment (block 628). In one embodiment, issuer 202 tracks whether provider supports host-to-host fulfillment, perhaps by storing such information in service provider identification database 214. In another embodiment, issuer 202 does not maintain such information but instead queries provider 204 on a case-by-case basis, perhaps by attempting to establish a host-to-host connection to provider 204 or its telecommunications switch. If provider 204 does not support host-to-host fulfillment, issuer processing system 210 schedules the transaction for off-line fulfillment (block 630). As used herein, the term "off-line fulfillment" means any fulfillment method that is not completed automatically during the communication with the customer 208.

According to one embodiment, an employee of issuer 202 completes the off-line fulfillment transaction by initiating a communication with service provider 204 to complete the fulfillment transaction. For instance, the employee might call an operator of provider 204 to relay the details of the transaction (i.e., the identifier, the amount of the credit, and the customer response to any service provider rules, discussed above), optionally obtaining a confirmation number for the transaction. Provider 204 is then responsible for adding the proper amount of credit to the customer's prepaid account and billing issuer 202 for the amount of the credit. Alternatively, the employee might communicate the relevant information to provider 204 via other means, such as completing a form on a web site of provider 204, sending an electronic message comprising the relevant information to provider 204, faxing the relevant information to provider 204 or leaving a voice message with service provider 204. Those skilled in the art will recognize that many other modes of communication also would accomplish this function without varying from the scope of the invention.

In other embodiments of the invention, off-line fulfillment occurs automatically. For instance, issuer processing system 210 might send individual fulfillment requests electronically to service provider 204, using any of the methods described above. Alternatively, issuer processing system 210 might compile fulfillment requests for a particular provider 204 into batch data files in a specified format and send such files to the particular provider 204 periodically, for instance on an hourly or daily basis. Provider 204 then may fulfill the requests using any suitable method and, in some embodiments, may return a confirmation to issuer 202 that the requests were fulfilled.

If provider 204 does support host-to-host fulfillment, issuer processing system 210 performs a host-to-host fulfillment (block 632) by initiating a host-to-host connection with service provider 204, or more specifically, with a telecommunications switch operated by service provider 204. After establishing the host-to-host connection, issuer processing system 210 updates the amount of prepaid credit available to customer for services provided by the telecommunications switch. Other methods of host-to-host fulfillment are possible as well, depending on the configurations of issuer 202 and provider 204.

Upon either scheduling the off-line fulfillment (630) or fulfilling via host-to-host transaction (block 632), issuer processing system 210 advises customer 208 of the initiation of the fulfillment transaction. In some embodiments, issuer processing system 210 advises customer 208 of the amount of credit applied to customer's prepaid account and/or the quantity of services (e.g. the number of wireless or long distance minutes) added to the prepaid account. In other embodiments, for example when an off-line fulfillment transaction has been scheduled, issuer processing system 210 advises customer 208 of when customer 208 can expect the fulfillment transaction to be completed, such that the prepaid credit will be available for customer's use. For instance, in one embodiment, issuer processing system 210 notifies customer 208 that the credit will be available on a certain date (possibly the current date) and at a certain time. In another embodiment, issuer processing system 210 notifies customer 208 that the credit will be available after the elapse of a specified time period (for instance, four hours from the time of advisement). In still other embodiments, issuer processing system 210 advises customer 208 of both the amount of credit applied and the time when the credit should be available. In certain embodiments, for instance, when customer 208 contacts issuer 204 using a telephone, issuer processing system 210 advises customer 208 via spoken (or voice-synthesized) message over the telephone. In other embodiments, the advisement may be in the form of an electronic mail message, web page, facsimile transmission, or the like.

Some embodiments include the optional feature of collecting the electronic mail address of customer 208 (block 636). This feature allows issuer 202 to offer targeted mailings in the future. For instance, issuer 202 could, in the future, send an electronic mail announcement to customer 208 about a special discount on prepaid telecommunication services. In addition, if desired, issuer 202 can forward customer's electronic mail address to provider 204 to allow provider 204 to send similar targeted electronic mailings to customer 208. Issuer might also forward the electronic mail address to third parties interested in sending targeted mailings to customer 208. In some embodiments, customer 208 is allowed to choose which parties receive customer's electronic mail address, while in other embodiments, customer 208 is given the choice not to provide an electronic mail address at all. Depending on the mode of communication used by customer 208 to contact issuer 204, any of the above-described forms of data entry may be used by customer 208 to provide the electronic mail address.

In some embodiments, issuer processing system 210 optionally transmits branding messages to customer 208. Depending on the embodiment, branding messages may take many forms. Some branding messages may be interactive, with optional or required input from customer 208. Some embodiments include branding messages that are specific to issuer 202 or service provider 204. For instance, an issuer-specific branding message might be "Thank you for using <issuer name> for your prepaid <service> needs." Alternatively, a provider-specific branding message could contain a tagline, jingle or logo associated with provider 204. In some embodiments, issuer 202 allows provider 204 to specify and/or provide the content of the provider-specific branding message.

The branding message might also be specific to the passcode associated with the credit. For instance, issuer 204 might distribute credits with a predefined single serial number or set of serial numbers to a particular retailer, for example 7-Eleven™, and might even brand the cards with the name of that retailer. Then, when customer fulfills a credit purchased from that retailer, the serial number-specific branding message might say "Thank you for purchasing 7-Eleven™ prepaid telecommunication services. Press '1' if you would like to receive an e-coupon for a free Slurpee™ on your next visit to 7-Eleven™."

As with the advisement (block 634) described above, depending on the mode of communication between customer 208 and issuer 204, the branding message may be transmitted through any of a variety of means including over the telephone, via facsimile or electronic mail, or by web page. In some embodiments, issuer processing system 210 plays pre-recorded branding messages over the telephone to customer 208. In one such embodiment, customer 208 may respond to the message (for example, ask for more information about the subject of the message, or indicate that a printed mailing would be desired) by pressing a predefined key on the telephone keypad. The customer might also provide additional necessary information (for example, the customer's address or credit card number) in the same fashion.

Finally, issuer processing system 210 terminates the communication with customer 208. In some embodiments, termination consists of releasing customer's 208 telephone call (block 640). In other embodiments, termination might involve displaying a web page showing the details of the transaction. Depending on the mode of communication between customer 208 and issuer 204, other methods of termination known to those skilled in the art are possible as well without varying from the scope of the invention. In certain embodiments, termination may not be necessary.

In some embodiments, especially embodiments involving off-line fulfillment, issuer processing system 210 notifies customer 208 when the fulfillment transaction between issuer 202 and provider 204 has been completed (block 642). According to one such embodiment, if the fulfillment transaction with service provider 204 successfully has completed, the notification indicates the date and/or time of fulfillment. The notification optionally includes an indication of the credit added to the customer account or the new credit balance, either monetary or in some other denomination (e.g., additional prepaid wireless minutes), in the account. The notification might also include a confirmation number, especially if provider 204 had sent a confirmation number to issuer 202 upon completing the fulfillment transaction. The notification message may be sent to customer 208 via any of the several methods described above. In a certain aspect, the notification is sent to customer's 208 wireless phone, using a short messaging system ("SMS") message, a convention known to those skilled in the art.

If the transaction was unsuccessful, the notification may indicate that the transaction did not successfully complete and that customer 208 should contact issuer 202 to resolve any problems. Optionally, the failure notification can include a description of any specific problem encountered during the attempted fulfillment transaction. In some implementations, the notification asks customer 208 to contact issuer 202 within a specified time frame, issuer 202 attempts to contact customer 208, perhaps via telephone call from a live operator.

Optionally, issuer processing system 202 can save information about the fulfillment transaction, whether successful or unsuccessful. This information can be added to the appropriate customer database record in customer database 404 by, for instance, being appended to the fulfillment history (described above). In addition, the information can also be stored in prepaid card database 212, if desired.

In conclusion, the present invention provides novel systems and methods for implementing and fulfilling prepaid telecommunication services credits. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a method for applying the prepaid credit to the customer's telecommunication services account, the method comprising:

the issuer receiving a communication from the customer;
the issuer receiving the passcode from the customer;
upon validating the passcode, the issuer associating the prepaid credit with an identifier;
the issuer associating the prepaid credit with a particular provider; and
the issuer fulfilling an account with the particular provider, wherein the account is associated with the identifier and fulfilling the account comprises adding an amount to the account equal to the prepaid credit;
wherein associating the prepaid credit with a particular provider comprises allowing the customer to choose a provider and associating the prepaid credit with the chosen provider.

2. The method of claim 1, wherein the passcode is selected from a group consisting of a serial number, a personal identification number ("PIN"), and a combination of a serial number and a PIN.

3. The method of claim 1, wherein the amount of the prepaid credit is determined at the time the customer obtains the credit.

4. The method of claim 1, wherein the prepaid telecommunications service is selected from a group consisting of wireless telephone service, long distance telephone service, local telephone service, and Internet service.

5. The method of claim 1, wherein the communication comprises a network communication.

6. The method of claim 1, wherein the communication comprises a telephone call.

7. The method of claim 6, wherein the telephone call is initiated by the customer entering a preconfigured string on a wireless phone.

8. The method of claim 6, wherein the identifier comprises a telephone number.

9. The method of claim 8, wherein associating the prepaid credit with the identifier comprises associating the prepaid credit with a record in a customer database, the record comprising the identifier.

10. The method of claim 6, wherein fulfilling an account comprises:

the issuer transferring the telephone call to the particular provider for fulfillment.

11. The method of claim 1, wherein allowing the customer to choose a provider comprises presenting a menu of eligible providers and allowing the customer to select a provider from the menu.

12. The method of claim 1, wherein fulfilling an account comprises using a host-to-host connection to add an amount to the account equal to the prepaid credit.

13. The method of claim 1, wherein fulfilling an account comprises using off-line fulfillment to add an amount to the account equal to the prepaid credit.

14. The method of claim 1, further comprising the issuer transmitting a marketing message to the customer.

15. The method of claim 1, further comprising the issuer confirming the account fulfillment.

16. The method of claim 15, wherein confirming the account fulfillment comprises:

creating a message; and
sending the message to the customer.

17. The method of claim 16, wherein if the fulfillment is successful, the message includes the time of fulfillment and the amount of credit added to the account.

18. The method of claim 16, wherein if the fulfillment is not successful, the message includes a notification that the fulfillment was not successful and a request that the customer contact the issuer.

19. The method of claim 18, wherein confirming the account fulfillment further comprises:

if the fulfillment is not successful and the customer has not contacted the issuer, contacting the customer directly to confirm the unsuccessful fulfillment.

20. The method of claim 16, wherein the message is a short messaging service ("SMS") message, and wherein sending the message to the customer comprises transmitting the message to a wireless device associated with the identifier.

21. The method of claim 1, wherein the prepaid credit is a prepaid telecommunication services card.

22. The method of claim 1, wherein the prepaid credit is a prepaid credit purchased on the Internet.

23. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a method for applying the prepaid credit to the customer's telecommunication services account, the method comprising:
  the issuer receiving a communication from the customer, wherein the communication comprises a telephone call;
  the issuer receiving the passcode from the customer;
  upon validating the passcode, the issuer associating the prepaid credit with an identifier comprising a telephone number;
  the issuer associating the prepaid credit with a particular provider;
  and the issuer fulfilling an account with the particular provider, wherein the account is associated with the identifier and fulfilling the account comprises adding an amount to the account equal to the prepaid credit;
  wherein associating the prepaid credit with a customer database record comprises:
    (i) obtaining an automatic number identification ("ANI") from the telephone connection used to contact the issuer;
    (ii) searching a customer database for a record including an identifier matching the ANI; and
    (iii) associating the prepaid credit with the record.

24. The method of claim 23, wherein associating the credit with a customer database record further comprises:
  if an existing customer database record comprises an identifier matching the ANI, associating the prepaid credit with the identifier in the existing record; and
  if no existing customer database record comprises an identifier that matches the ANI, obtaining an identifier from the customer, creating a new customer database record comprising the obtained identifier, and associating the prepaid credit with the obtained identifier.

25. The method of claim 24, wherein the identifier obtained from the customer is selected from a group consisting of a mobile identification number ("MIN"), the ANI, and a telephone number different from the ANI.

26. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a method for applying the prepaid credit to the customer's telecommunication services account, the method comprising:
  the issuer receiving a communication from the customer;
  the issuer receiving the passcode from the customer;
  upon validating the passcode, the issuer associating the prepaid credit with an identifier;
  the issuer associating the prepaid credit with a particular provider; and
  the issuer fulfilling an account with the particular provider, wherein the account is associated with the identifier and fulfilling the account comprises adding an amount to the account equal to the prepaid credit;
  wherein associating the prepaid credit with a particular provider comprises:
    (i) searching a customer database to determine whether the customer is a repeat customer; and
    (ii) if the customer is a repeat customer, determining a particular provider from a previous transaction history and associating the prepaid credit with the particular provider.

27. The method of claim 26, wherein associating the credit with a particular provider further comprises:
  if the customer is not a repeat customer, updating the customer database with a record comprising the identifier.

28. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a method for applying the prepaid credit to the customer's telecommunication services account, the method comprising:
  the issuer receiving a communication from the customer;
  the issuer receiving the passcode from the customer;
  upon validating the passcode, the issuer associating the prepaid credit with an identifier;
  the issuer associating the prepaid credit with a particular provider; and
  the issuer fulfilling an account with the particular provider, wherein the account is associated with the identifier and fulfilling the account comprises adding an amount to the account equal to the prepaid credit;
  wherein associating the prepaid credit with a particular provider comprises searching a cross-reference database of providers for a record comprising the identifier.

29. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a method for applying the prepaid credit to the customer's telecommunication services account, the method comprising:
  the issuer receiving a communication from the customer;
  the issuer receiving the passcode from the customer;
  upon validating the passcode, the issuer associating the prepaid credit with an identifier;
  the issuer associating the prepaid credit with a particular provider; and
  the issuer fulfilling an account with the particular provider, wherein the account is associated with the identifier and fulfilling the account comprises adding an amount to the account equal to the prepaid credit;
  wherein associating the prepaid credit with a particular provider comprises querying at least one provider to find a provider that acknowledges the identifier and associating the prepaid credit with the provider that acknowledges the identifier.

30. The method of claim 29, wherein querying at least one provider comprises establishing a host-to-host connection with at least one provider.

31. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a method for applying the prepaid credit to the customer's telecommunication services account, the method comprising:

the issuer receiving a communication from the customer;
the issuer receiving the passcode from the customer;
upon validating the passcode, the issuer associating the prepaid credit with an identifier;
the issuer associating the prepaid credit with a particular provider;
the issuer fulfilling an account with the particular provider, wherein the account is associated with the identifier and fulfilling the account comprises adding an amount to the account equal to the prepaid credit;
the issuer advising the customer of the amount of credit to be added to the account; and
the issuer advising the customer when the credit will be added to the account.

32. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a system for applying the prepaid credit to the customer's telecommunication services account, the system comprising:

a processing system;
a customer database in communication with the processing system; and
a computer-readable medium in communication with the processing system, wherein the computer-readable medium comprises instructions executable by the processing system to:
(i) receive a communication from the customer using a communication device;
(ii) receive the passcode from the customer using the communication device;
(iii) validate the passcode;
(iv) associate the prepaid credit with an identifier by accessing the customer database;
(v) associate the prepaid credit with a particular provider; and
(vi) communicate with a provider system to fulfill the customer account.

33. The system of claim 32, wherein the passcode is selected from a group consisting of a serial number, a personal identification number ("PIN"), and a combination of a serial number and a PIN.

34. The system of claim 32, wherein the amount of the prepaid credit is determined at the time the customer obtains the credit.

35. The system of claim 32, wherein the prepaid telecommunications service is selected from a group consisting of wireless telephone service, long distance telephone service, local telephone service, and Internet service.

36. The system of claim 32, wherein the communication from the customer comprises a network communication.

37. The system of claim 32, wherein the communication from the customer comprises a telephone call.

38. The system of claim 37, wherein fulfilling an account comprises transferring the telephone call to the provider for fulfillment.

39. The system of claim 37, wherein the identifier comprises a telephone number.

40. The system of claim 39, wherein associating the prepaid credit with the identifier comprises associating the prepaid credit with a record in the customer database, the record comprising the identifier.

41. The system of claim 40, wherein associating the prepaid credit with a record comprises:
obtaining an automatic number identification ("ANI") from the telephone connection used to contact the issuer;
searching the customer database for a record including an identifier matching the ANI; and
associating the prepaid credit with the record.

42. The system of claim 41, wherein associating the credit with a customer database record further comprises:
if an existing customer database record comprises an identifier matching the ANI, associating the prepaid credit with the identifier in the existing record; and
if no existing customer database record comprises an identifier that matches the ANI, obtaining an identifier from the customer, creating a new customer database record comprising the obtained identifier, and associating the prepaid credit with the obtained identifier.

43. The system of claim 42, wherein the identifier obtained from the customer is selected from a group consisting of a mobile identification number ("MIN"), the ANI, and a telephone number different from the ANI.

44. The system of claim 32, wherein associating the prepaid credit with a particular provider comprises:
searching the customer database to determine whether the customer is a repeat customer;
if the customer is a repeat customer, determining a particular provider from a previous transaction history and associating the prepaid credit with the particular provider.

45. The system of claim 44, wherein associating the credit with a particular provider further comprises:
if the customer is not a repeat customer, updating the customer database with a record comprising the identifier.

46. The system of claim 32 further comprising a cross-reference database in communication with the processing system, wherein associating the prepaid credit with a particular provider comprises:
searching the cross-reference database for a record comprising the identifier.

47. The system of claim 32, wherein associating the prepaid credit with a particular provider further comprises querying at least one provider to find a provider that acknowledges the identifier and associating the prepaid credit with the provider that acknowledges the identifier.

48. The system of claim 47, wherein querying at least one provider comprises establishing a host-to-host connection with at least one provider.

49. The system of claim 32, wherein associating the prepaid credit with a particular provider comprises allowing the customer to choose a provider and associating the prepaid credit with the chosen provider.

50. The system of claim 49, wherein allowing the customer to choose a provider comprises presenting a menu of eligible providers and allowing the customer to select a provider from the menu.

51. The system of claim 32, wherein the computer-readable medium comprises further instructions executable by the processing system to:

advise the customer of the amount of credit to be added to the account; and advise the customer when the credit will be added to the account.

52. The system of claim 32, wherein fulfilling an account comprises using a host-to-host connection to add an amount to the account equal to the prepaid credit.

53. The system of claim 32, wherein fulfilling an account comprises using off-line fulfillment to add an amount to the account equal to the prepaid credit.

54. The system of claim 32, wherein the computer-readable medium comprises further instructions executable by the processing system to transmit a marketing message to the customer.

55. The system of claim 32, wherein the computer-readable medium comprises further instructions executable by the processing system to confirm the account fulfillment.

56. The system of claim 55, wherein confirming the account fulfillment comprises:

creating a message; and sending the message to the customer.

57. The system of claim 56, wherein if the fulfillment is successful, the message includes the time of fulfillment and the amount of credit added to the account.

58. The system of claim 57, wherein if the fulfillment is not successful, the message includes a notification that the fulfillment was not successful and a request that the customer contact the issuer.

59. The system of claim 58, wherein confirming the account fulfillment further comprises:

if the fulfillment is not successful and the customer has not contacted the issuer, contacting the customer directly to confirm the unsuccessful fulfillment.

60. The system of claim 56, wherein the message is a short messaging service ("SMS") message, and wherein sending the message to the customer comprises transmitting the message to a wireless device associated with the identifier.

61. The system of claim 32, wherein the prepaid credit is a prepaid telecommunication services card.

62. The system of claim 32, wherein the prepaid credit is a prepaid credit purchased on the Internet.

63. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a system for applying the prepaid credit to the customer's telecommunication services account, the system comprising:

a processing system;

a customer database in communication with the processing system; and a computer-readable medium in communication with the processing system, wherein the computer-readable medium comprises a set of instructions executable by the processing system, the set of instructions comprising:

(i) instructions to receive a communication from the customer, wherein the communication comprises a telephone call;

(ii) instructions to receive the passcode from the customer;

(iii) instructions to associate the prepaid credit with an identifier comprising a telephone number;

(iv) instructions to associate the prepaid credit with a particular provider; and (v) instructions to fulfill an account with the particular provider, wherein the account is associated with the identifier and fulfilling the account comprises adding an amount to the account equal to the prepaid credit;

wherein the instructions to associate the prepaid credit with a customer database record comprise:

(a) instructions to obtain an automatic number identification ("ANI") from the telephone connection used to contact the issuer;

(b) instructions to search a customer database for a record including an identifier matching the ANI; and (c) instructions to associate the prepaid credit with the record.

64. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a system for applying the prepaid credit to the customer's telecommunication services account, the system comprising:

a processing system;

a customer database in communication with the processing system; and a computer-readable medium in communication with the processing system, wherein the computer-readable medium comprises a set of instructions executable by the processing system, the set of instructions comprising:

(i) instructions to receive a communication from the customer;

(ii) instructions to receive the passcode from the customer;

(iii) instructions to associate the prepaid credit with an identifier;

(iv) instructions to associate the prepaid credit with a particular provider; and (v) instructions to fulfill an account with the particular provider, wherein the account is associated with the identifier and fulfilling the account comprises adding an amount to the account equal to the prepaid credit;

wherein the instructions to associate the prepaid credit with a particular provider comprise:

(a) instructions to search a customer database to determine whether the customer is a repeat customer; and (b) if the customer is a repeat customer, instructions to determine a particular provider from a previous transaction history and associate the prepaid credit with the particular provider.

65. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a system for applying the prepaid credit to the customer's telecommunication services account, the system comprising:

a processing system;

a customer database in communication with the processing system; and a computer-readable medium in communication with the processing system, wherein the computer-readable medium comprises a set of instructions executable by the processing system, the set of instructions comprising:

(i) instructions to receive a communication from the customer;

(ii) instructions to receive the passcode from the customer;
(iii) instructions to associate the prepaid credit with an identifier;
(iv) instructions to associate the prepaid credit with a particular provider; and
(v) instructions to fulfill an account with the particular provider, wherein the account is associated with the identifier and fulfilling the account comprises adding an amount to the account equal to the prepaid credit;
wherein the instructions to associate the prepaid credit with a particular provider comprise instructions to search a cross-reference database of providers for a record comprising the identifier.

66. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a system for applying the prepaid credit to the customer's telecommunication services account, the system comprising:
a processing system;
a customer database in communication with the processing system; and
a computer-readable medium in communication with the processing system, wherein the computer-readable medium comprises a set of instructions executable by the processing system, the set of instructions comprising:
(i) instructions to receive a communication from the customer;
(ii) instructions to receive the passcode from the customer;
(iii) instructions to associate the prepaid credit with an identifier;
(iv) instructions to associate the prepaid credit with a particular provider; and
(v) instructions to fulfill an account with the particular provider, wherein the account is associated with the identifier and fulfilling the account comprises adding an amount to the account equal to the prepaid credit;
wherein the instructions to associate the prepaid credit with a particular provider comprise:
(a) instructions to query at least one provider to find a provider that acknowledges the identifier; and
(b) instructions to associate the prepaid credit with the provider that acknowledges the identifier.

67. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a system for applying the prepaid credit to the customer's telecommunication services account, the system comprising:
a processing system;
a customer database in communication with the processing system; and
a computer-readable medium in communication with the processing system, wherein the computer-readable medium comprises a set of instructions executable by the processing system, the set of instructions comprising:
(i) instructions to receive a communication from the customer;
(ii) instructions to receive the passcode from the customer;
(iii) instructions to associate the prepaid credit with an identifier;
(iv) instructions to associate the prepaid credit with a particular provider; and
(v) instructions to fulfill an account with the particular provider, wherein the account is associated with the identifier and fulfilling the account comprises adding an amount to the account equal to the prepaid credit;
wherein the instructions to associate the prepaid credit with a particular provider comprise instructions to allow the customer to choose a provider and associating the prepaid credit with the chosen provider.

68. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a system for applying the prepaid credit to the customer's telecommunication services account, the system comprising:
a processing system;
a customer database in communication with the processing system; and
a computer-readable medium in communication with the processing system, wherein the computer-readable medium comprises a set of instructions executable by the processing system, the set of instructions comprising:
(i) instructions to receive a communication from the customer;
(ii) instructions to receive the passcode from the customer;
(iii) instructions to associate the prepaid credit with an identifier;
(iv) instructions to associate the prepaid credit with a particular provider;
(v) instructions to fulfill an account with the particular provider, wherein the account is associated with the identifier and fulfilling the account comprises adding an amount to the account equal to the prepaid credit;
(vi) instructions to advise the customer of the amount of credit to be added to the account; and
(vii) instructions to advise the customer when the credit will be added to the account.

69. In a relationship where a customer has obtained a prepaid credit for telecommunication services ("prepaid credit"), including a preconfigured passcode, from a universal prepaid telecommunication services credit issuer ("issuer"), the issuer being a different entity than a telecommunication services provider ("provider"), a method for applying the prepaid credit to the customer's telecommunication services account, the method comprising:
the issuer receiving a communication from the customer using a communication device;
the issuer receiving the passcode from the customer using the communication device;
the issuer validating the passcode;
the issuer associating the prepaid credit with an identifier by accessing a customer database;
the issuer associating the prepaid credit with a particular provider; and
the issuer communicating with a provider system to fulfill the customer account.

* * * * *